UNITED STATES PATENT OFFICE.

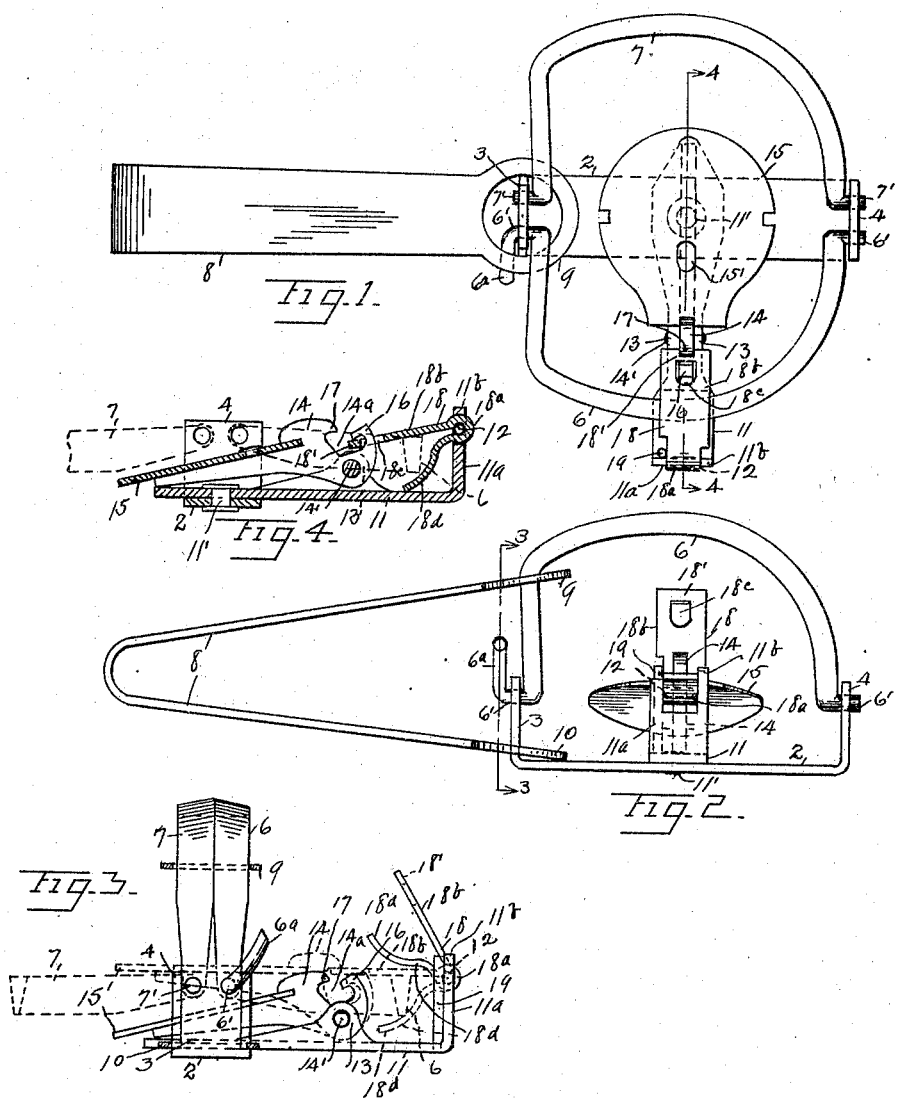

THOMAS H. DONLON, OF SYRACUSE, NEW YORK.

ANIMAL-TRAP.

1,303,265.  Specification of Letters Patent.  Patented May 13, 1919.

Application filed March 6, 1919. Serial No. 280,882.

*To all whom it may concern:*

Be it known that I, THOMAS H. DONLON, a citizen of the United States, residing at Syracuse, in the county of Onondaga and State of New York, have invented certain new and useful Improvements in Animal-Traps, of which the following is a specification.

This invention relates to improvements in animal traps, and has for its object to provide a trap of the common spring actuated type, wherein by the compression of the actuating spring, one of the jaws engages and operates a latch, and throws the same into a safe locking engagement with the bait-plate support, which permits the trap to be baited and set, and afterward carried to the trapping ground, without danger of the trap being sprung accidentally. And a further object is to provide novel and simple means for shifting the latch from the safe to the trapping position.

I attain these objects by the means set forth in the detailed description which follows, and as illustrated by the accompanying drawing, in which—

Figure 1 is a top plan view of the trap set in the trapping position. Fig. 2 is a side elevation of the trap in the released position. Fig. 3 is a vertical cross-section, substantially on line 3—3 of Fig. 2, in which the full lines show the parts released, and the dotted lines show the various parts in the same position as in Fig. 1. Fig. 4 is a similar sectional view taken on line 4—4 of Fig. 1; showing the jaws open and the latch held in the safety locking position by gravity by the bait-plate.

In the drawing, 2 represents the base plate having its opposite ends turned upwardly for providing lugs 3 and 4, the said lugs being correspondingly perforated to pivotally receive the trunnions 6' and 7' of the jaws 6 and 7. One trunnion, 6' after passing through the lug 3 is extended and bent upwardly and outwardly to provide an operating hook 6$^a$. The jaws are closed and held in closed position by the power of a spring 8, which is bent upon itself and its ends are provided with loops 9 and 10, which encircle the corresponding arms of the jaws 6 and 7 and the end lug 3 of the base plate. The depressing or closing of the spring 8 brings the loop 9 into engagement with the hook 6$^a$ and forces the jaw 6 from the vertical to the horizontal position, for automatically setting the trap in the first, or safe position. 11 is a cross-plate, mounted upon and riveted to the base-plate, as at 11'. Plate 11 extends at right angles to the base 2, and its longer arm is bent upwardly to provide a lug 11$^a$, which is cut away near its upper end to provide an integral bar 12. Between the lug 11$^a$ and the base-plate, the sides of the cross-plate are folded toward each other to provide corresponding lugs 13, between which is pivoted a trigger or lever 14, by means of a pin 14'. 15 is the bait-plate which is mounted upon the tapering arm of the trigger and is secured thereto by riveting, as at 15', in the usual manner. The enlarged free end of the trigger 14 is provided with a cut-out or socket 14$^a$ in its top edge, for forming oppositely facing spaced teeth 16 and 17. The tooth 16 faces toward the bait-plate, and the tooth 17 faces toward the lug 11$^a$. 18 represents a latch, which is partially bent upon itself, and has a loop 18$^a$ which receives and pivots upon the bar 12. The upper or longer arm 18$^b$ of the latch is provided with an opening 18$^c$, which is in line with and receives the tooth 16 when the latch is moved forwardly and downwardly, as from the full line position shown in Fig. 3, to the position shown in Fig. 4. The shorter arm 18$^d$ of the latch is bent in a peculiar manner to provide a relatively large gap into which the jaw 6 enters when it is forced downwardly by the spring 8. 19 represents a spring which is secured at its lower end to the cross-plate 11, its upper end being in constant tension engagement with one end of the loop 18$^a$, for holding the latch in the raised or released position, shown in Fig. 3, ready to be engaged by the jaw 6 for resetting the trap. One of the upper corners of the lug 11$^a$ is extended slightly in the form of a lug 11$^b$, which serves to stop and limit the upward movement of the latch, as shown in Fig. 3. The spring 19 prevents the latch from gravitating while awaiting operation by the jaw 6.

In practice the trapper usually ties the bait on each of a number of bait-plates before he starts for the trapping ground. After the bait is secured to the plates 15, the trapper places his foot on each spring 8, and depresses the same until the jaw 6 engages and lowers the latch 18, from the position shown in Fig. 3, to that shown in Fig. 4. As the closed end 18' of the opening 18$^c$ strikes the inclined top of the tooth 16, the bait-plate and trigger are tilted upwardly slightly, to allow the portion 18' to slip beneath the point of the tooth 16 (see Fig. 4). The bait-plate then gravitates to its lowermost or fully released position, where it remains and holds the latch and the jaw 6 in the operated position against the tension of spring 8. After the traps are all baited and operated to the safety position, as described, the trapper gathers them up and carries them to the trapping ground. Upon reaching the latter, he places each trap, in order, in the desired location, but before leaving the trap, he inserts his finger beneath the jaw 7 and lifts the free end of the bait-plate from the position shown in Fig. 4, to the dotted position shown in Fig. 3—the latter being the trapping position. This lifting up of the bait-plate shifts the end 18' of the latch from its engagement with the underside of the tooth 16 to the underside of the tooth 17. The spring 8 continues to exert its tension through the jaw 6, and the arm 18$^b$ of the latch holds the parts in the position shown by the dotted lines in Fig. 3, until an animal attacks the bait. A slight jar or downward pressure upon the bait-plate releases the end 18' of the latch from the tooth 17, and the spring 8 forces the jaws 6 and 7 upwardly into the closed position, shown in Figs. 2 and 3. This upward swing of the jaw 6 moves the latch 18 to its fully released position, shown by full lines in Fig. 3, ready for a subsequent operation.

Having thus described my invention, what I claim, is—

1. An animal trap including a pair of jaws, an actuating spring for opening and closing said jaws, a bait-plate, a trigger supporting said plate and movable therewith, said trigger having a socket, a latch pivoted for movement in line with said trigger, said latch having two arms, one of said arms adapted to be engaged by one of said jaws for swinging the other arm into temporary locking engagement with one portion of said socket, said trigger adapted to be tilted upwardly for permitting the trap to be sprung by the depression of the bait-plate.

2. The combination with a pair of jaws and an actuating spring, of a bait-plate, a rockable trigger supporting said plate, and a latch pivoted for movement toward and away from said trigger, said latch having an arm disposed in the path of one of said jaws adapted to be depressed by the opening movement of said jaw for bringing a second arm into the safety locking engagement with said trigger, said trigger adapted to be subsequently tilted for disposing said parts in the trapping position.

3. An animal trap, including a pair of jaws, an actuating spring for opening and closing the jaws, a bait-plate, a trigger supporting said plate, said trigger having a pair of alining teeth, a latch pivoted to the trigger support in line with and movable into locking engagement with one of said teeth by the opening of said jaws for preventing the accidental springing of the trap, and tension means for holding the latch in the released position after the springing of the trap.

4. An animal trap, including a base-plate, an actuating spring, jaws pivoted to said plate, one of said jaws provided with an operating hook engaged by said spring for moving said jaw from the vertical to the horizontal position, a bait-plate, a trigger supporting said plate, one end of said trigger having a socket and two teeth facing said socket, a latch having a long and a short arm, the long arm having an opening to receive the nearest of said teeth for setting the trap in the safe position, the short arm of said latch adapted to be depressed by the opening of said jaws, said long arm adapted to be released from the nearest tooth and brought into engagement with the farthermost tooth by the lifting of said bait-plate.

In testimony whereof I affix my signature.

THOMAS H. DONLON.

Copies of this patent may be obtained for five cents each, by addressing the "Commissioner of Patents, Washington, D. C."